(12) United States Patent
Starek et al.

(10) Patent No.: US 6,256,646 B1
(45) Date of Patent: Jul. 3, 2001

(54) METHOD AND SYSTEM FOR IDENTIFYING THE STATE OF A MEDIA DEVICE BY MONITORING FILE SYSTEM CALLS

(75) Inventors: Robert Phillip Starek; Carlos A. Murdock, both of Austin, TX (US)

(73) Assignee: Infraworks Corporation, Austin, TX (US)

( * ) Notice: Subject to any disclaimer, the term of this patent is extended or adjusted under 35 U.S.C. 154(b) by 0 days.

(21) Appl. No.: 09/114,402

(22) Filed: Jul. 13, 1998

(51) Int. Cl.[7] ........................................ G06F 12/00

(52) U.S. Cl. ...................... 707/205; 707/101; 707/102; 707/104; 707/201

(58) Field of Search ..................................... 707/205, 200; 709/202; 395/200, 615, 672, 186; 360/132; 711/112

(56) References Cited

U.S. PATENT DOCUMENTS

| | | | | |
|---|---|---|---|---|
| 5,239,437 | * | 4/1992 | Hoge et al. | 360/132 |
| 5,827,453 | * | 6/1996 | Roberts | 395/200 |
| 5,832,513 | * | 6/1996 | Kennedy | 707/202 |
| 5,946,278 | * | 9/1997 | Tower | 340/825 |
| 6,003,041 | * | 1/1998 | Wugofski | 707/104 |
| 6,044,436 | * | 11/1997 | Otsuka | 711/112 |

* cited by examiner

*Primary Examiner*—Wayne Amsbury
*Assistant Examiner*—Thuy Do
(74) *Attorney, Agent, or Firm*—Schnader Harrison Segal & Lewis, LLP

(57) ABSTRACT

The state of a media device is identified by monitoring file system calls. A determination is made whether or not a file system call originated from a specified high level application. In one implementation, the high level application writes to a monitored media device in order to perform a flushing process to securely delete inactive data.

9 Claims, 2 Drawing Sheets

METHOD AND SYSTEM FOR IDENTIFYING THE STATE OF A MEDIA DEVICE BY MONITORING FILE SYSTEM CALLS

TECHNICAL FIELD OF THE INVENTION

The present invention relates in general to the field of electronic systems, and more specifically to a method and system for identifying the state of a media device by monitoring file system calls.

BACKGROUND OF THE INVENTION

Computers systems typically have operating systems that access media devices, such as disk drives, through low level device drivers. Applications generally execute above the operating system and pass file system calls through the operating system to store or access data on media devices. The file system calls are typically handled at a low level by the device driver associated with the particular media device.

There can be situations when it is desirable for an application to perform a direct media I/O to a media device. In this case, the access would not pass through the file system. However, this direct I/O can be dangerous in that there must be an assurance that the structure of data on the media device is known. Otherwise, active data could be improperly handled or overwritten. One means for obtaining this assurance is to obtain a lock on the media device by which only the locking application has access to the media device. However, some media devices, such as boot volumes in WINDOWS NT, are non-lockable. In other words, there is no defined interface that allows an application to gain exclusive access to the media device.

In conventional systems, if the operating system is not running on a media device (e.g., a volume of a disk drive), the system will often allow a user program or application to obtain exclusive access to the media device. If a media device is deemed non-lockable, an application could always boot from another operating system with the desired media device attached as a "lockable" device and perform the desired action with the media device under an exclusive lock. However, there are no conventional options for providing "error free" direct I/O to a media device, such as a volume of a fixed disk, while an operating system is up and running and has deemed the media device non-lockable.

Further, it can be desirable to "flush" or "clean" file system residue from a media device, such as a disk volume, thus making it impossible for any data to be recovered from what was once a deleted file on the file system. In general, file system residue includes all aspects of deleted files that remain on the media device. For example, freed data on a volume of a disk drive will reside in many places on the format of the volume. Inactive data can reside in any freed allocations on the disk and also in the descriptors (attributes of the data) that house the name of old files along with pointers to where the old file data once resided. Despite the desirability of flushing all such file system residue, conventional flushing products only operate to flush the free allocations on the file system. This does not remove all of the file system residue from a deleted file. Rather, it only handles data that is in an unallocated state on the media device.

SUMMARY OF THE INVENTION

In accordance with the present invention, a method and system for identifying the state of a media device by monitoring file system calls are disclosed that provide advantages over conventional methods and applications.

According to one aspect of the present invention, file system calls are monitored and information is obtained therefrom. It is determined from this whether the file system call originated from a specified high level application. If the file system call did not originate from the specified high level application, a state for a monitored media device is set to indicate an unknown state if the file system call will modify the monitored media device. If the file system call did originate from the specified high level application, a state for the monitored media device is set to indicate a known state if the file system call is a read request. Further, in one embodiment, if the file system call is a write request that originated from the specified high level application and the monitored media device is in a known state, the file system call is allowed to pass to a low level driver for the monitored media device. On the other hand, if the file system call is a write request that originated from the specified high level application and the monitored media device is in an unknown state, the file system call is rejected. In one implementation, the high level application writes to the monitored media device in order to perform a flushing process on the monitored media device to securely delete inactive data.

A technical advantage of the present invention is the ability to allow a native operating system to continue to run and function as normal, while direct read/writes are performed to a non-lockable media device (e.g., a WINDOWS NT boot volume) without corruption of data stored on the media device. This ability can be particularly helpful for performing a flush of inactive data on the media device such that the inactive data is securely deleted and rendered unrecoverable.

Another technical advantage is the provision of a robust flushing process that can remove all file attribute data (e.g., file control block data in WINDOWS NT), can remove slack space at the end of every file up to the next cluster, and can securely clean free clusters to make any data from file system residue unrecoverable.

Additional technical advantages should be readily apparent from the drawings, description, and claims.

BRIEF DESCRIPTION OF THE DRAWINGS

A more complete understanding of the present invention and advantages thereof may be acquired by referring to the following description taken in conjunction with the accompanying drawings in which like reference numbers indicate like features and wherein.

DETAILED DESCRIPTION OF THE INVENTION

Figure 1:
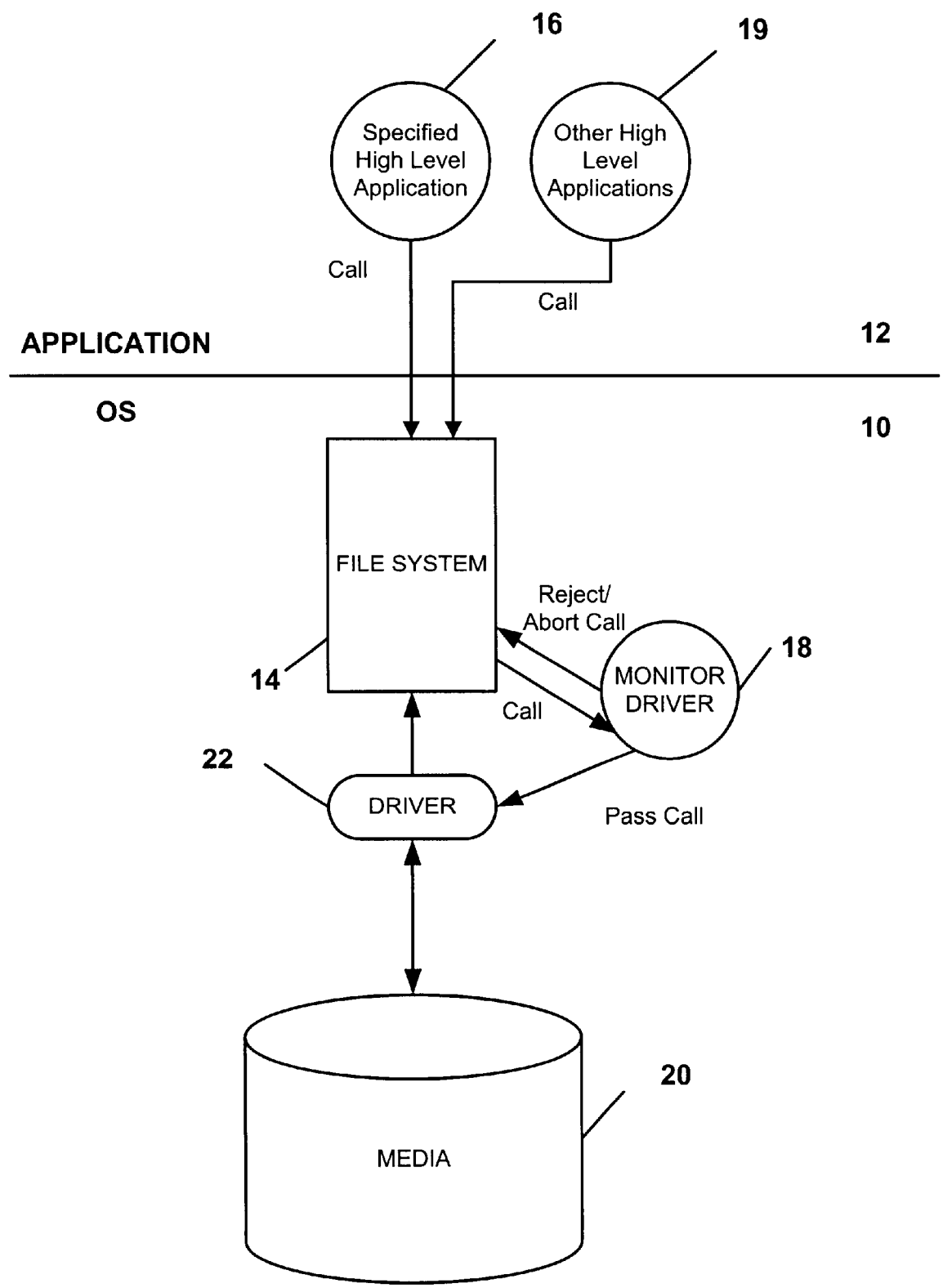
FIG. 1 is a block diagram of one embodiment of a system for identifying the state of a media device by monitoring file system calls.

FIG. 1 is a block diagram of one embodiment of a system for identifying the state of a media device by monitoring file system calls. As shown, the system includes an operating system (OS) layer 10 and an application layer 12. In one implementation, operating system layer 10 is WINDOWS NT. Operating system 10 includes a file system 14 (e.g., NTFS) that handles calls from applications in application layer 12. In general, device drivers become a device in operating system 10, and applications in application layer 12 use devices to perform tasks through a defined application program interface (API).

One of the applications in application layer 12 can be a specified high level application 16 that is associated with a monitor driver 18. For example, specified application 16 and monitor driver 18 can be components delivered by one software vendor and can cooperate to perform functions, such as a real-time disk flush as described below. Monitor driver 18 operates to monitor and react to calls passing through file system 14. One embodiment of the operation of monitor driver 18 is shown and described with respect to FIG. 2. In addition to specified application 16, other high level applications 19 can be present in application layer 12 and can send calls through file system 14. File system calls can include "read" and "write" calls to a media device 20 such as a fixed storage device. Each media device 20 generally has associated with it a low level driver 22 that handles the interface with media device 20.

In operation, monitor driver 18 obtains and analyzes each call passing through file system 14. Monitor driver 18 can gain access to file system calls, for example, by plugging into file system 14 as a device driver without actually being associated with a particular device. Using this access, monitor driver 18 can assess whether the call originated from specified application 16 or other applications 19 and whether the call is a "read" call or a "write" call. Monitor process 18 can also decide whether to pass the call on to driver 22 associated with media device 20 or to reject or abort the call. The information that monitor driver 18 obtains from file system calls allows it to monitor and identify the state of media device 20. For example, monitor driver 18 can identify whether media device 20 is in a known or unknown state.

Figure 2:
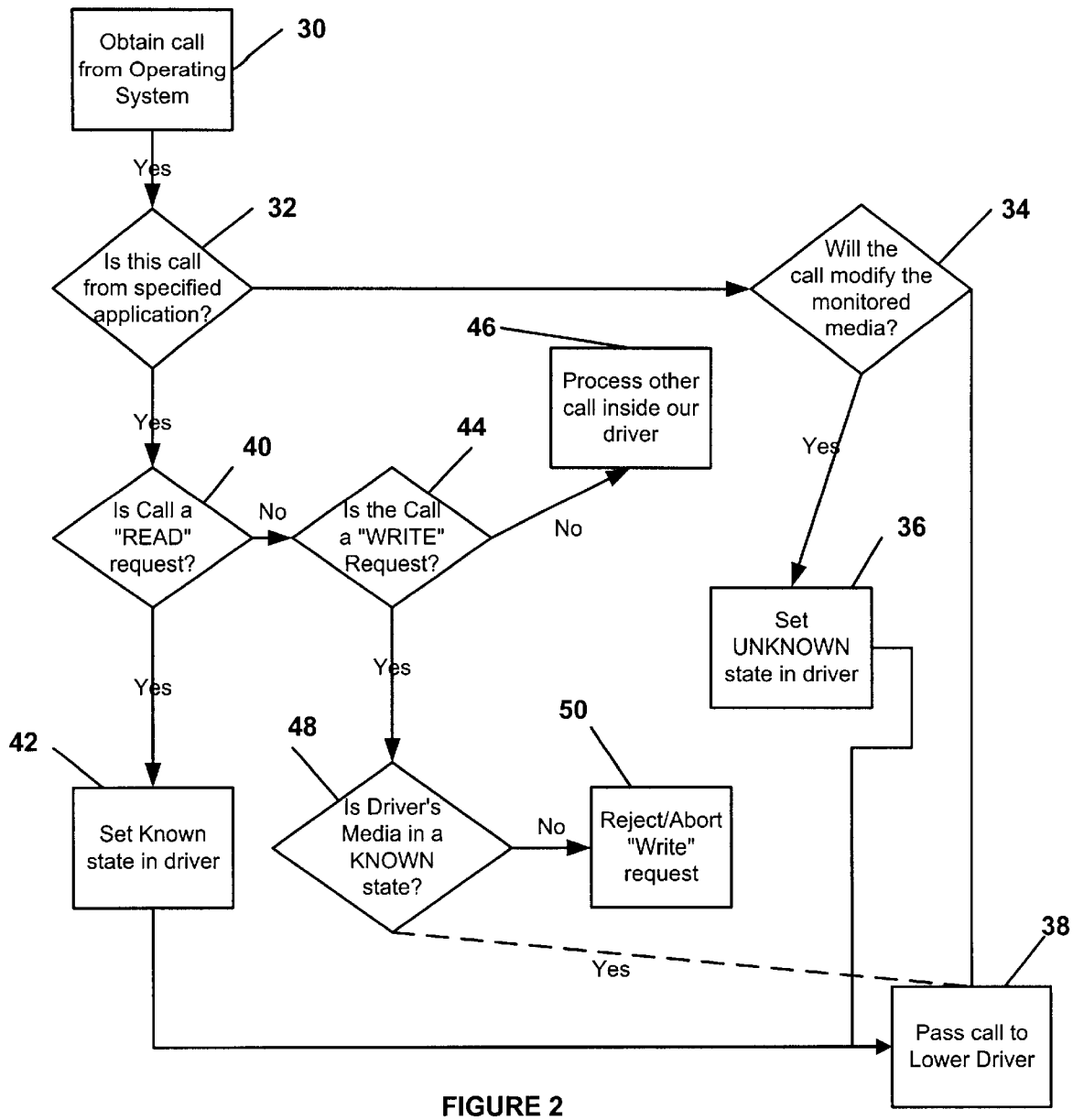
FIG. 2 is a flow chart of one embodiment of a method for identifying the state of a media device by monitoring file system calls.

FIG. 2 is a flow chart of one embodiment of a method for identifying the state of a media device by monitoring file system calls. In this embodiment, the method is performed by monitor driver 18 of FIG. 1. As shown, in step 30, monitor driver 18 obtains file system calls from the operating system. Then, in step 32, monitor driver 18 determines whether the call originated from specified application 16. If not, monitor driver 18 determines, in step 34, whether the call will modify the monitored media device 20. If so, in step 36, monitor driver 18 sets an internal state to "UNKNOWN" for that media device 20. The state is considered to be UNKNOWN because the file system call may modify media device 20 in which case monitor driver 18 can no longer be sure of the structure of data stored on media device 20. After step 36, monitor driver 18 passes the call, in step 38, to the low level driver 22. Also, if in step 34, the call will not modify the monitored media device 20, monitor driver 18 moves to step 38 and passes the call to driver 22. In this case, monitor driver 18 does not change its internal state for media device 20.

Returning to step 32, if the call is from specified application 16, then monitor driver 18 reacts differently. In step 40, monitor driver 18 determines whether the call is a "read" request. If so, in step 42, monitor driver 18 sets an internal state to "KNOWN" for media device 20. The state is considered to be KNOWN because after the "read", specified application 16 will have accurate knowledged of the structure of data stored on media device 20. After step 42, monitor driver 18 moves to step 38 and passes the call to driver 22.

Returning to step 40, if the call is not a "read" request, monitor driver 18 determines, in step 44, whether the call is a "write" request. If not, in step 46, monitor driver 18 processes the other call as needed. If the call is a "write" request, monitor driver 18 determines, in step 48, whether its internal state for media device 20 is "KNOWN". If not, monitor driver 18 rejects/aborts the "write" request in step 50. If the internal state is "KNOWN", then monitor driver 18 moves to step 38 and passes the call to driver 22. This operation by monitor driver 18 ensures that specified application 16 is not allowed to write to media device 20 unless media device 20 is in a KNOWN state. One application for this lock-out of media device 20 is where specified application 16 is performing a real-time flush of media device 20 to securely delete portions of media device 20. In this case, the state of media device 20 must be KNOWN or specified application 16 could potentially delete active data.

In this manner, a low level device driver, such as monitor driver 18, can be used to alert a high level application, such as specified application 16, that the data on a media device has changed over an interval of time. This scheme can be used to ensure that the state of the media has not been altered since a sample on the media was obtained. If the media has been altered, the high level application is alerted and takes appropriate action. In particular, this can be used to allow a high level application to safely write to a disk or volume for which an exclusive lock on the disk cannot be obtained. For example, an exclusive lock can not be obtained on a boot volume in a WINDOWS NT system.

As mentioned above, the monitor driver can become part of the system. In WINDOWS NT, the monitor driver is a kernel mode application that can monitor and manipulate low-level system events that are in the context of the "device drivers" type. Once the monitor driver has registered what type of calls it would like to monitor with the WINDOWS NT IO/Manager, all of the system events/calls that were once bound for other devices/device drivers are first routed through the newly created device/device driver on the system. The monitor driver, at that point, can determine what actions should be taken, and act accordingly based on the information that was previously stored along with the information in the current call. For example, this can include the method set forth in FIG. 2, above.

Once monitor driver is created/installed on the system by the specified high level application, the monitor driver can distinguish between the specified high level application that installed the monitor driver and all other high level applications on the system. This allows for the monitor driver to act on requests/calls in the context of the specified application that is calling down to the device/device driver. The monitor driver can then trigger events, set flags, perform calculations, modify calls, reject calls, etc., when any high-level application calls down to the device/device driver.

Working together, the monitor driver and the high level application can perform a number of functions. For example, some products available from STRATFOR SYSTEMS, INC. of Austin, Tex., use this type of scheme to insure that any direct disk write to an non-lockable volume (of a media device) is done without corrupting data on the disk. This is accomplished with a combination of the specified application and the monitor driver installed on the system to monitor access to the volume.

In operation, the specified application can request that a section of a disk (or other media device) be read through the standard API. Since the monitor driver is installed on the system, it will see the read request come through the device being monitored and can mark the device in a KNOWN state (as shown in FIG. 2). From the information that is read from the disk, some calculations can be performed by the specified application to see if there is a need to write/modify the section of the disk that was read. For example, the specified application could determine whether there is inactive data that needs to be securely deleted.

Most operating systems in the current marketplace are preemptive multitasking environments in which other applications running on the system can change the data on any section of a disk (or other media device) at any time. Thus, during the time that calculations/analysis are being performed by the specified application, the data on the disk could have changed or could have remained untouched. If "writes" are made from other applications to the disk, the monitor driver can flag the disk to be in a state of UNKNOWN. If the specified application "writes" to the disk when in a state of UNKNOWN, the monitor driver will fail the write, forcing the logic in the specified application to re-try the read/calculate and write sequence again. Thus, by using the specified application in conjunction with the monitor driver, the combination guarantees that the application will not overwrite data on the disk where the disk has changed during the read/process/write interval.

One reason that the monitor driver is needed is so that direct media I/O can be performed on a media device that the operating system views as non-lockable. For example, a boot volume is non-lockable in WINDOWS NT which means that there is no defined API that will allow an application to obtain exclusive access on the boot volume while the WINDOWS NT operating system is up and running. In particular, the following characteristics make the monitor driver important to accomplishing direct media I/O: (1) the system has deemed the volume "non-lockable" during normal operation of the system; (2) the application must perform direct reads and write to a volume that is "non-lockable" and keep a high level of confidence that the data, when rewritten to the disk, will not be corrupting new data just written to the disk, and (3) the system is functioning on a complex operating system which has means for multitasking and preemption. When the above characteristics are present, a monitor driver on the system should be used for the purpose of monitoring/filtering/evaluating events so that direct volume access can be safely performed while the core operating system (e.g., WINDOWS NT) is running on a non-lockable volume (e.g., boot volume).

One use for this capability to perform direct I/O on a non-lockable media device is important to performing a "flush" to cleanse all free allocation on a media device thus securely deleting inactive data and rendering it unrecoverable. This ability to perform direct I/O to all media device space (lockable or non-lockable) enables robust flushing process unique from any conventional products. Such a flushing process can remove all File Attribute Data (e.g., file control block data in WINDOWS NT/95). Slack space at the end of every file on the media device can be removed up to the next cluster. Further, free clusters can be securely cleaned to make any data from file system residue unrecoverable. The present flushing process can clean the internals of each file on the system. It can clean the "tail" of the file, which is technically allocated for the file, from the ending point of the data to the next cluster on the system.

The flush process will ensure that data from an old file is not residing in the tail of a newly allocated file on the system. The attributes to all of the files on the systems can then be purged/cleaned of all deleted entries. This will clean old files' name, cluster assignment, and other attributes that could lead back to a deleted file. Next the flush process can address all of the free allocations that reside on the media device at the time of the flush. This will clean all of the allocations that have been freed by the system and returned to the unallocated cluster pool.

The flush process can be implemented, for example, for the NT file system (NTFS). In NTFS, all file and directory information contained within an NTFS volume is tracked by the Master File Table (MFT). The MFT is a linear list of File Control Blocks (FCB). The NTFS flush process steps through the MFT and securely deletes (shreds) the content of each file control block of any extra information. If the FCB contains a valid entry, then only the extra, unused space is securely deleted. If the FCB is a deleted record, then the entire block is securely deleted. Once the FCB is securely deleted, the block is read to determine what type of record the block contains. If the record is an actual file, the unused space in the last allocated cluster is securely deleted (i.e., slackspace). If the record is a directory, then a more thorough process is required. NTFS stores directory information by creating additional index runs that contain all of the file names or sub directory names that are in the directory. The NTFS flush process steps through each index run and securely deletes all extra space. If a deleted file is contained within one of the directories, that part of the index run is securely deleted. Once the MFT has been parsed, a WINDOWS NT API call can be used to determine the free clusters on the volume. The flush process then steps through each free cluster and securely deletes the entire cluster. The flush process is then complete.

The flush process also can be implemented, for example, for the older FAT file system. In general, all file attribute information on FAT file systems is included inside a (FCB) File Control Block on the file system. The FCBs on the file system make up all of the directories and files that can be located or found on the file system. When acting on a FAT file system, the flush process will perform at least three functions. The flush process will securely delete (e.g., by overwriting data) from the true absolute ending byte of a file to the next cluster on the disk (slack space). The flush process will securely delete every FCB that is not in use on the file system (ghosted entries). Further, the flush process will securely delete every file system declared free allocation on the disk (free space). By using the above three techniques in flushing a FAT file system, all of the once deleted data on the system is made unrecoverable.

When flushing the deleted FCBs (ghosted entries), "slack space" at the end of the file, and free space on the system the flush process can use the following methodologies. First the process reads in the boot sector to determine the size and location of the FAT, the FAT type (FAT12, 16, 32), the sectors per cluster, and the location of the root directory on the system. Once the variables are obtained the process can then jump to the root directory and start processing each file and directory on the system. The flush simply recursively steps through each file and directory on the system by following the FCBs that are currently "active" on the system. When the process encounters a FILE FCB, the offsets are calculated for the ending cluster of the file along with the amount to securely delete in the tail. The process then writes the last cluster of the file to the desired specification thus securely deleting the data in the slack space of the file. When the process encounters a DIRECTORY FCB, the flush simply recurses into the branch and continues forward. During the processing of all FCBs, the flush will encounter entries that have been "removed/deleted/ghosted". The flush process marks the offset of the deleted FCB in the current cluster for further processing. Once all of the FCBs are processed in the cluster, all of the "deleted/ghosted" FCBs are securely deleted to specification by writing the entire cluster containing the FCBs the desired number of times with the desired overwrite specifier. When all of the recursion through the FCBs on the system is finished, the flush then overwrite all of the unallocated/free clusters on the disk. To do this, the flush process can simply step through each entry in the File Allocation Table to see if the cluster is in use. If the cluster is not in use, it is securely deleted to specification, and if it is in use, it remains untouched by the process. The flush process can optimize this process by allowing contiguous free clusters, up to a defined number, to be batched and then overwritten together in a single pass.

Although the present invention has been described in detail, it should be understood that various changes, substitutions and alterations can be made hereto without departing from the spirit and scope of the invention as defined by the appended claims.

What is claimed is:

1. A method for identifying the state of a media device by monitoring file system calls, comprising:

monitoring and obtaining information from a file system call;

determining whether the file system call originated from a specified high level application;

setting a state for a monitored media device to indicate an unknown state if the file system call did not originate from the specified high level application and will modify the monitored media device;

setting a state for the monitored media device to indicate a known state if the file system call did originate from the specified high level application and is a read request;

allowing the file system call to pass to a low level driver for the monitored media device if the file system call is a write request that originated from the specified high level application and the monitored media device is in a known state;

rejecting the file system call if the file system call is a write request that originated from the specified high level application and the monitored media device is in an unknown state; and wherein the high level application writes to the monitored media device to perform a flushing process on the monitored media device to securely delete inactive data.

2. The method of claim 1, wherein the monitored media device is a volume on a disk drive.

3. The method of claim 2, wherein the inactive data securely deleted comprises free clusters on the disk drive.

4. The method of claim 2, wherein the volume is a boot volume of an operating system.

5. The method of claim 1, wherein the method is implemented by a monitor driver that appears to an operating system as a low level device driver.

6. A system for identifying the state of a media device by monitoring file system calls, comprising:

a monitor driver operating as a low level driver in an operating system; and a high level application associated with the monitor driver;

the monitor driver operating:

to monitor and obtain information from a file system call;

to determine whether the file system call originated from a specified high level application;

to set a state for a monitored media device to indicate an unknown state if the file system call did not originate from the specified high level application and will modify the monitored media device;

to set a state for the monitored media device to indicate a known state if the file system call did originate from the specified high level application and is a read request;

to allow the file system call to pass to a low level driver for the monitored media device if the file system call is a write request that originated from the specified high level application and the monitored media device is in a known state;

to reject the file system call if the file system call is a write request that originated from the specified high level application and the monitored media device is in an unknown state; and wherein the high level application writes to the monitored media device to perform a flushing process on the monitored media device to securely delete inactive data.

7. The system of claim 6, wherein the monitored media device is a volume on a disk drive.

8. The system of claim 7, wherein the inactive data securely deleted comprises free clusters on the disk drive.

9. The system of claim 7, wherein the volume is a boot volume of an operating system.

* * * * *